US012664686B2

(12) United States Patent
Sha et al.

(10) Patent No.: US 12,664,686 B2
(45) Date of Patent: Jun. 23, 2026

(54) METHOD FOR DETERMINING CAMERA ATTITUDE AND ELECTRONIC DEVICE

(71) Applicant: Lenovo (Beijing) Limited, Beijing (CN)

(72) Inventors: Hao Sha, Beijing (CN); Jing Fan, Beijing (CN); Liang Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 266 days.

(21) Appl. No.: 18/585,607

(22) Filed: Feb. 23, 2024

(65) Prior Publication Data

US 2024/0289987 A1 Aug. 29, 2024

(30) Foreign Application Priority Data

Feb. 24, 2023 (CN) .......................... 202310165275.X

(51) Int. Cl.
| | |
|---|---|
| *G06T 7/80* | (2017.01) |
| *G06T 7/70* | (2017.01) |
| *H04N 23/61* | (2023.01) |
| *H04N 23/66* | (2023.01) |
| *H04N 23/695* | (2023.01) |

(52) U.S. Cl.
CPC .................. *G06T 7/80* (2017.01); *G06T 7/70* (2017.01); *H04N 23/61* (2023.01); *H04N 23/66* (2023.01); *H04N 23/695* (2023.01); *G06T 2207/30244* (2013.01)

(58) Field of Classification Search
CPC ... G06T 7/80; G06T 7/70; G06T 2207/30244; G06T 2207/10016; G06T 2207/20084; G06T 7/73; G06T 7/55; H04N 23/61; H04N 23/66; H04N 23/695; H04N 23/60; H04N 23/64; G06V 10/757
See application file for complete search history.

(56) References Cited

U.S. PATENT DOCUMENTS

| | | | |
|---|---|---|---|
| 2016/0010982 A1* | 1/2016 | Shih | H04N 7/18 |
| | | | 348/136 |
| 2017/0208243 A1* | 7/2017 | Masad | G06V 20/582 |
| 2017/0278231 A1* | 9/2017 | Narasimha | G06T 7/277 |
| 2018/0324345 A1* | 11/2018 | Liang | H04N 23/66 |
| 2019/0259176 A1* | 8/2019 | Dai | G06T 7/73 |
| 2020/0334854 A1* | 10/2020 | Lin | G06T 7/248 |
| 2022/0398767 A1* | 12/2022 | Zheng | G06V 10/25 |

* cited by examiner

*Primary Examiner* — Wassim Mahrouka
(74) *Attorney, Agent, or Firm* — ANOVA LAW GROUP, PLLC

(57) ABSTRACT

A method for determining camera attitude includes: in response to a first input image satisfying a first condition, adjusting a camera from a first attitude to a second attitude, the first input image being an image obtained by the camera in the first attitude; obtaining a second input image, the second input image being an image obtained by the camera in the second attitude; determining second attitude data corresponding to the second attitude based on the second input image; and determining first attitude data corresponding to the first attitude according to a transformation relationship between the first attitude and the second attitude, and the second attitude data.

20 Claims, 7 Drawing Sheets

S101

Recognizing a portion of the first input image whose texture intensity satisfies a second condition    A1

Determining a first adjustment parameter according to a position of the portion of the first input image    A2

Adjusting the camera from the first attitude to the second attitude according to the first adjustment parameter    A3

FIG. 2

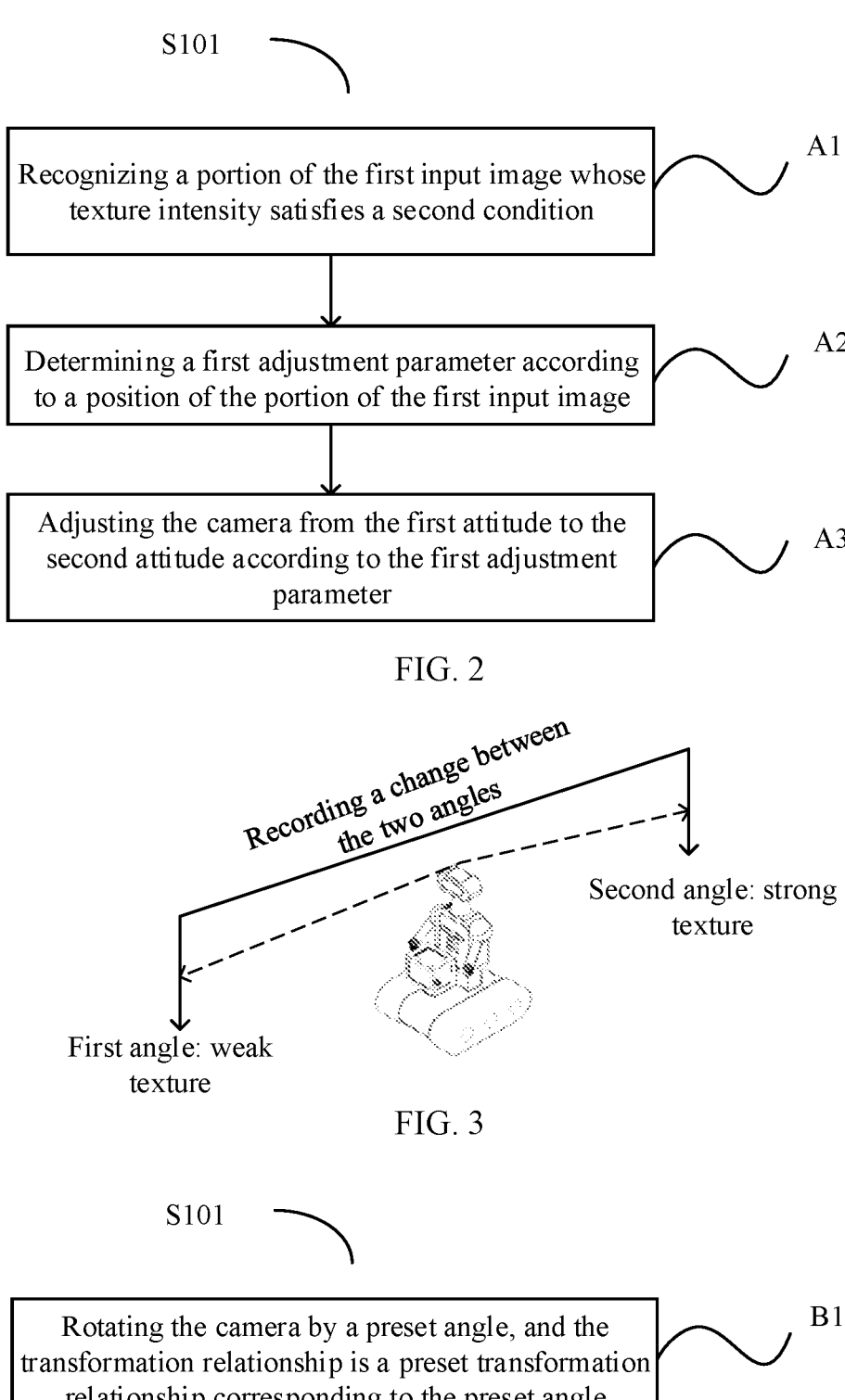

Recording a change between the two angles

Second angle: strong texture

First angle: weak texture

Rotating the camera by a preset angle, and the transformation relationship is a preset transformation relationship corresponding to the preset angle    B1

FIG. 4

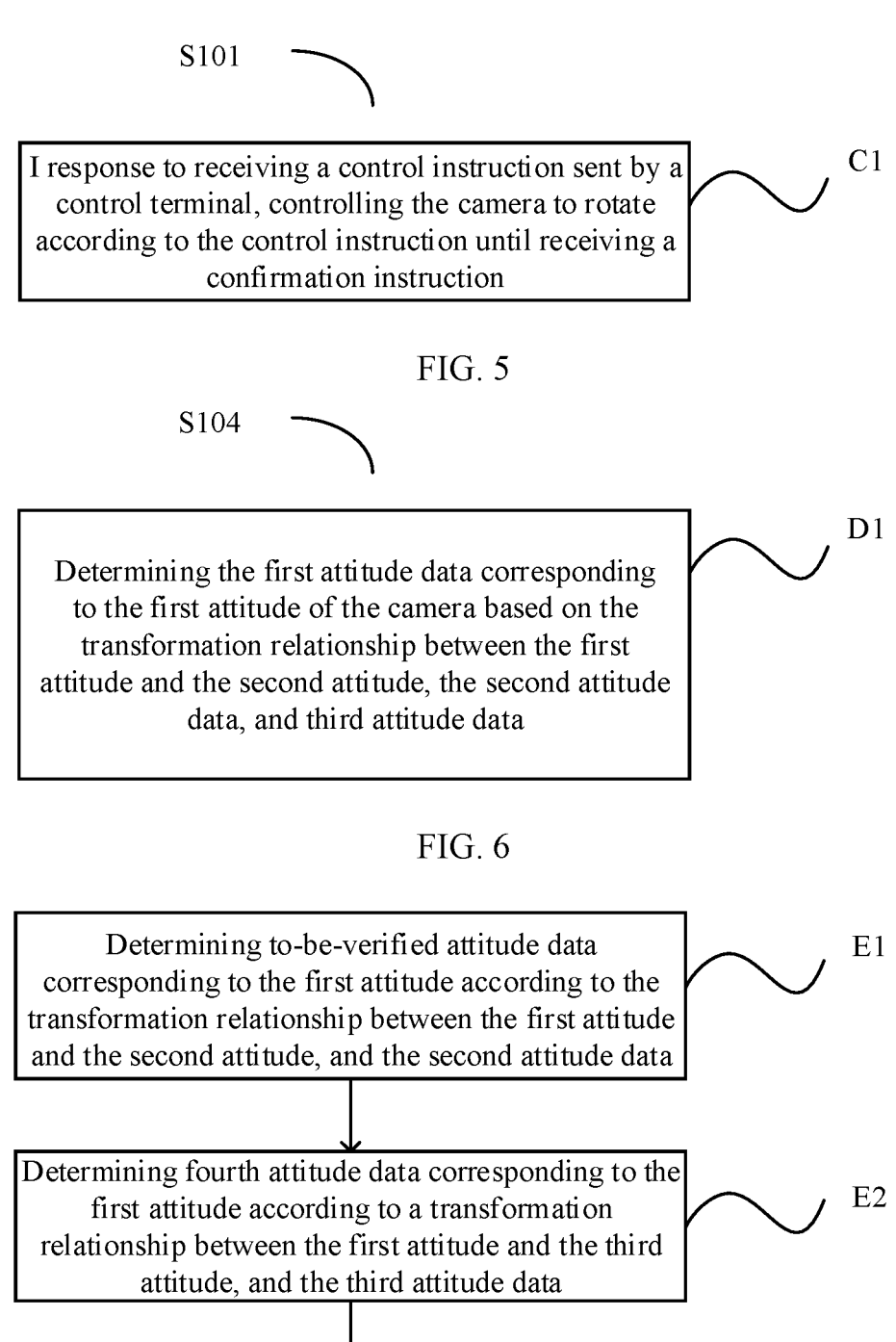

S101

I response to receiving a control instruction sent by a control terminal, controlling the camera to rotate according to the control instruction until receiving a confirmation instruction                    C1

Determining the first attitude data corresponding to the first attitude of the camera based on the transformation relationship between the first attitude and the second attitude, the second attitude data, and third attitude data                    D1

FIG. 6

Determining to-be-verified attitude data corresponding to the first attitude according to the transformation relationship between the first attitude and the second attitude, and the second attitude data                    E1

Determining fourth attitude data corresponding to the first attitude according to a transformation relationship between the first attitude and the third attitude, and the third attitude data                    E2

When the accuracy of verifying the to-be-verified attitude data based on the fourth attitude data reaches a preset accuracy, determining the to-be-verified attitude data To be the first attitude data                    E3

FIG. 7

D1

F1

Determining the first attitude data corresponding to the first attitude of the camera according to the transformation relationship between the first attitude and the second attitude, the second attitude data, the transformation relationship between the first attitude and the third attitude, the third attitude data

Sending a display instruction to the control terminal. The display instruction is used to instruct the control terminal to display a direction prompt icon. The direction indicated by the direction prompt icon is consistent with the direction in which the camera is adjusted from the first attitude to the second attitude

FIG. 9

According to IMU data, prompting to move from the current object position to the to-be-adjusted object position To-be-adjusted object position Current object position Displayed image

METHOD FOR DETERMINING CAMERA ATTITUDE AND ELECTRONIC DEVICE

CROSS-REFERENCE TO RELATED APPLICATION

This application claims priority to Chinese Patent Application No. 202310165275X, filed on Feb. 24, 2023, and the entire content of which is incorporated herein by reference.

TECHNICAL FIELD

The present disclosure relates to the technical field of computer technology, and more particularly, to a method for determining camera attitude and an electronic device.

BACKGROUND

Augmented Reality (AR) technology is a technology that calculates positions and angles of camera images in real time and adds corresponding images, videos, or 3D models. The goal of this technology is to juxtapose a virtual world with a real world on a display screen and to interact with a mixed world.

In the application scenario of an inspection system, natural images may be used as template images (markers) for matching and corresponding camera attitude information can be obtained. The natural images may be environmental image data collected by cameras. In the process of obtaining the camera attitude information based on the marker images, due to weak texture intensity of certain images, texture information of the certain images cannot even be obtained. When a large smooth area (e.g., wall, glass) appears in an image and many people block views in front of a camera lens, feature points may not be accurately extracted from the image. Correspondingly, the camera attitude may not be accurately determined based on the image. Thus, accuracy of the determined attitude information cannot be guaranteed.

SUMMARY

One aspect of the present disclosure provides a method for determining camera attitude. The method includes: in response to a first input image satisfying a first condition, adjusting a camera from a first attitude to a second attitude, the first input image being an image obtained by the camera in the first attitude; obtaining a second input image, the second input image being an image obtained by the camera in the second attitude; determining second attitude data corresponding to the second attitude based on the second input image; and determining first attitude data corresponding to the first attitude according to a transformation relationship between the first attitude and the second attitude, and the second attitude data.

Another aspect of the present disclosure provides an electronic device. The electronic device includes a memory storing a computer program and a processor coupled to the memory. When being executed by the processor, the computer program causes the processor to: in response to a first input image satisfying a first condition, adjust a camera from a first attitude to a second attitude, the first input image being an image obtained by the camera in the first attitude; obtain a second input image, the second input image being an image obtained by the camera in the second attitude; determine second attitude data corresponding to the second attitude based on the second input image; and determine first attitude data corresponding to the first attitude according to a transformation relationship between the first attitude and the second attitude, and the second attitude data.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

FIG. 2 is a flowchart of an implementation of S101 in FIG. 1;

FIG. 3 is a schematic diagram showing camera angle adjustment from a first attitude to a second attitude in FIG. 2;

FIG. 4 is a flowchart of another implementation of S101 in FIG. 1;

FIG. 5 is a flowchart of another implementation of S101 in FIG. 1;

FIG. 6 is a flowchart of an implementation of S104 in FIG. 1;

FIG. 7 is a flowchart of another method for determining camera attitude according to some embodiments of the present disclosure;

FIG. 8 is a flowchart of an implementation of D1 in FIG. 6;

FIG. 9 is a flowchart of another method for determining camera attitude according to some embodiments of the present disclosure;

DETAILED DESCRIPTION OF THE EMBODIMENTS

Figure 1:
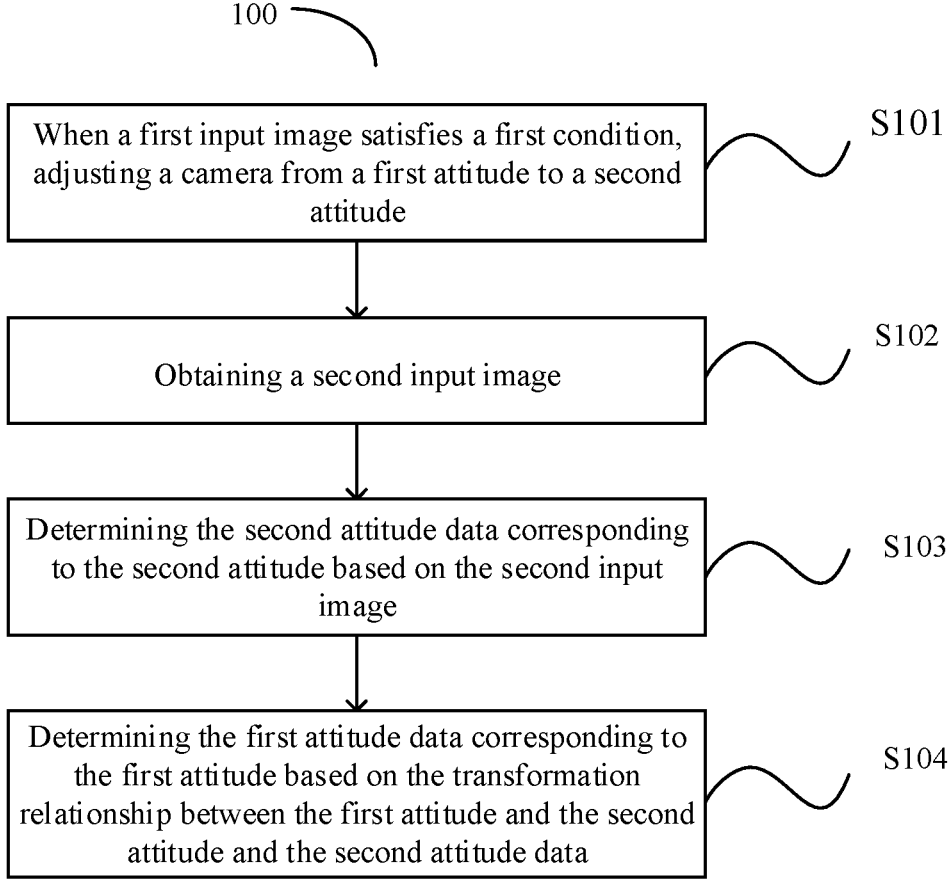
FIG. 1 is a flowchart of a method for determining camera attitude according to some embodiments of the present disclosure.

To enable those skilled in the art to better understand the technical solutions in the embodiments of the present disclosure, the technical solutions in the embodiments of the present disclosure will be clearly and completely described below in conjunction with the drawings in the embodiments of the present disclosure. Obviously, the described embodiments are merely some of the embodiments of the present disclosure, not all of them. Based on the embodiments of the present disclosure, all other embodiments obtained by those of ordinary skill in the art without creative efforts fall within the scope of the present disclosure.

In the field of robot vision, attitude information of a device (e.g., an AR device, a robot, etc.) is often obtained based on a camera. In application scenarios such as an inspection system, vision-based relocation methods are often used to extract features from an input image of an environment collected by the camera. Feature points are matched with pre-established scene structure information to obtain the camera's attitude information. In most cases, this method can achieve good results. However, in special cases, due to low resolution of the input image collected, analysis of the input image is often erroneous, or texture information of the input image is weak and effective texture cannot be obtained, which may lead to inaccurate or failed calculation of the attitude information. Or, when large smooth areas (e.g., walls, glasses, etc.) appear in the input image, and when pedestrians are blocking the lens in front of the camera, the calculation of the attitude information will be inaccurate or failed due to inability to obtain effective textures.

The present disclosure optimizes and improves the method of determining camera attitude that is based on the relocation method in the existing technology.

Based on at least one of the aforementioned technical problems, the present disclosure provides a method for determining camera attitude. The method includes: when a first input images satisfies a first condition, adjusting the camera from a first attitude to a second attitude, where the first input image is an image obtained by the camera in the first attitude; obtaining a second input image, where the second input image is an image obtained by the camera in the second attitude; determine second attitude data corresponding to the second attitude based on the second input image; based on a transformation relationship between the first attitude and the second attitude, and the second attitude data, determining first attitude data corresponding to the first attitude. In the method of determining the camera attitude provided by the embodiments of the present disclosure, when the camera cannot accurately determine the first attitude, the camera is adjusted from the first attitude to the second attitude, the second attitude data corresponding to the second attitude is determined, and the first attitude data corresponding to the first attitude is determined based on the transformation relationship between the first attitude and the second attitude, and the second attitude data, thereby improving the accuracy of camera repositioning.

FIG. 1 is a flowchart of a method for determining camera attitude according to some embodiments of the present disclosure. As shown in FIG. 1, the method 100 of determining camera attitude includes the following processes.

At S101, when a first input image satisfies a first condition, a camera is adjusted from a first attitude to a second attitude.

The first input image is an image obtained by the camera in the first attitude.

In the embodiment of the present disclosure, the camera may be an image collection device installed on a device such as a robot or AR glasses, or it may be an image collection module embedded in a mobile phone, a tablet, or a wearable device. For example, when an inspection robot is moving around, the inspection robot controls the camera to collect input images of the environment, uses a repositioning algorithm to calculate current attitude data of the camera based on the input images collected by the camera, and uses the camera's attitude data to generate a control command, or calculates and generates other data based on the camera's attitude data, etc.

In some embodiment of the present disclosure, the first input image satisfying the first condition includes at least one of the following: texture intensity of the first input image fails to reach a preset value; the first attitude data cannot be calculated through the first input image; or the first input image has a pedestrian area interference value.

When calculating the current first attitude data of the camera through the first input image, a device such as a robot, a pair of AR glasses, or a processing unit embedded in the camera performs feature extraction on the first input image, compares the extracted feature with pre-established scene structure information, and obtains the current attitude information of the camera. The scene structure information may be either a displayed three-dimensional (3D) model or an implicit relative attitude relationship between images extracted by a deep neural network. However, when the texture intensity of the first input image is weak, or when a large smooth area (wall, glass) appears in the first input image, or people blocking the camera lens are detected, there will be situations where effective texture information cannot be obtained or there is interference from pedestrian areas, resulting in a failure to calculate the first attitude data through the first input image. Thus, when calculating the effective texture intensity, pedestrian area interference needs to be eliminated. This can be done by using traditional techniques such as pedestrian detection algorithms to eliminate pedestrian area interference.

In the embodiments of the present disclosure, the adjustment of the camera from the first attitude to the second attitude may be performed through a variety of methods. Various adjustment methods are introduced below, but are not intended to limit the protection scope of the present disclosure.

FIG. 2 is a flowchart of an implementation of S101 in FIG. 1. In some embodiments, as shown in FIG. 2, adjusting the camera from the first attitude to the second attitude in S101 includes the following processes.

At A1, a portion of the first input image whose texture intensity satisfies a second condition is recognized.

The second condition includes: the texture intensity of the portion of the first input image reaches the preset value; the first attitude data cannot be calculated through the portion of the first input image; and the portion of the first input image does not have a pedestrian area interference value. Under certain circumstances, for example, when no portion of the first input image whose texture intensity satisfies the second condition exists, the portion of the first input image that satisfies any one or two of the above three conditions may be selected.

At A1, the camera is configured on the inspection robot. The first input image is divided into a plurality of ports. Texture detection is performed on each portion of the first input image. The texture intensity of each portion is obtained. A method for determining the texture intensity may use, for example, the Sobel edge extraction method to determine the texture intensity of each portion, and then the portion of the first input image that satisfies the second condition is selected.

At A2, a first adjustment parameter is determined according to a position of the portion of the first input image.

In some embodiments, the first adjustment parameter may be a direction and an angle of camera rotation. For example, when determining the direction, a center point of the first input image may point in the direction of a center point of the portion of the first input image. When determining the angle, the center point of the first input image is connected to the center point of the portion of the first input image to determine a length of the connection line. According to the conversion formula of radians and degrees, the angle of the camera rotation may be determined.

At A3, the camera is adjusted from the first attitude to the second attitude according to the first adjustment parameter.

After the angle and direction of the camera rotation is determined at A2, the camera may be adjusted from the first attitude to the second attitude according to the angle and direction of the camera rotation. FIG. 3 is a schematic diagram showing camera angle adjustment from a first attitude to a second attitude in FIG. 2. As shown in FIG. 3, when the camera is at a first angle, the first input image collected by the camera has weak texture. When the camera is at a second angle, a second input image collected by the camera has strong texture. The camera is rotated from the first angle to the second angle. Thus, the adjustment of the camera from the first attitude to the second attitude is achieved.

At the same time, to subsequently calculate the first attitude data through the second attitude data, the direction and angle of the camera rotation may be recorded while the camera is rotating to determine the transformation relationship between the first attitude data and the second attitude data.

It should be noted that due to limitations of input images, the second attitude may not be determined with one adjustment. The above process of the adjustment may be repeated. Each time the camera attitude is adjusted, the texture intensity of an input image in the current attitude is determined. If the texture intensity is weak, or there is still interference from the pedestrian area, or the attitude calculation fails, the above process of the adjustment may be performed repeatedly until the second attitude is eventually determined.

FIG. 4 is a flowchart of another exemplary implementation of S101 in FIG. 1. In some embodiments, as shown in FIG. 4, adjusting the camera from the first attitude to the second attitude at S101 includes the following process.

At B1, the camera is rotated by a preset angle, and the transformation relationship is a preset transformation relationship corresponding to the preset angle.

For example, because the device such as an inspection robot and a pair of AR glasses knows in advance an action route of the inspection robot and a 3D map of a space the inspection robot passes through, the second attitude that should be adjusted to is also known in advance when the inspection robot is at a specified location. Thus, the preset angle of the camera rotation can be directly set. At this time, the transformation relationship is the preset transformation relationship corresponding to the preset angle, and then the first attitude data can be calculated from the second attitude data according to the preset transformation relationship.

For example, whether an image with strong texture is collected may be determined while the camera is being rotated. Or the camera may be directly rotated at a preset angle to determine whether a candidate image collected at the preset angle is an image with strong texture. If so, the candidate image is directly used as the second input image to calculate the second attitude data. If the candidate image is not an image with strong texture, the camera is controlled to continue to rotate to collect images from other angles. Under normal circumstances, it is rare for all images from different angles in a scene to be images with weak texture, the above method can directly find the second input image with strong texture in most cases. If an image with strong texture cannot be found under special circumstances, then the camera will continue to be rotated looking for an image with strong texture.

FIG. 5 is a flowchart of another exemplary implementation of S101 in FIG. 1. In some embodiments, as shown in FIG. 5, adjusting the camera from the first attitude to the second attitude at S101 includes the following process.

At C1, in response to receiving a control instruction sent by a control terminal, the camera is controlled to rotate according to the control instruction until receiving a confirmation instruction.

For the device such as an inspection robot and a pair of AR glasses, the control terminal may actually obtain the first input image collected by the camera on the device. The control terminal determines the direction and the angle that the camera should adjust based on the first input image, and sends the control instruction to the camera to control the rotation of the camera. When the camera rotates to the second attitude that satisfies the corresponding condition, the control terminal sends the confirmation instruction to the camera to stop the rotation.

Referring back to FIG. 1, at S102, a second input image is obtained.

The second input image is an image obtained by the camera in the second attitude.

In the embodiments of the present disclosure, due to the limitations of the input images, the second attitude may not be determined through one adjustment. The second attitude may be determined through multiple adjustments until the second attitude is finally determined. Then the camera collects the second input image in the second attitude.

Referring back to FIG. 1, at S103, the second attitude data corresponding to the second attitude is determined based on the second input image.

In the embodiments of the present disclosure, when the camera is in the second attitude, a relocation algorithm may be used to calculate the second attitude data of the camera in the second attitude. For example, the second attitude data may be 6DoF attitude data. When using a vision-based repositioning method, features of the second input image are first extracted and then are matched with pre-established scene structure information to obtain the second attitude data of the camera in the current attitude. The scene structure information may be the displayed 3D model, or may be the implicit relative attitude relationship between the images extracted by the deep neural network.

Referring to FIG. 1, at S104, the first attitude data corresponding to the first attitude is determined based on the transformation relationship between the first attitude and the second attitude and the second attitude data.

In the embodiments of the present disclosure, for example, the camera may be adjusted to the attitude only once, and the first attitude data corresponding to the first attitude is determined based on the transformation relationship between the first attitude and the second attitude and the second attitude data. In another example, an intermediate attitude data corresponding to the first attitude may be determined for a first time based on the transformation relationship between the first attitude and the second attitude and the second attitude data, and then after multiple adjustments or verifications, the first attitude data that satisfies the accuracy requirement can be eventually determined FIG. 6 is a flowchart of an implementation of S104 in FIG. 1. In some embodiments, as shown in FIG. 6, at S104, determining the first attitude data corresponding to the first attitude S104 based on the transformation relationship between the first attitude and the second attitude and the second attitude data includes the following process.

At D1, the first attitude data corresponding to the first attitude of the camera is determined based on the transformation relationship between the first attitude and the second attitude, the second attitude data, and third attitude data. The third attitude data is attitude data determined based on a third input image obtained by the camera in the third attitude.

In the embodiments of the present disclosure, because it is difficult to guarantee the accuracy of the result of only one camera attitude adjustment calculation, the camera may be adjusted for multiple attitude adjustments. Multiple attitude data corresponding to multiple images are calculated based on the multiple images obtained from the multiple attitude adjustments. The first attitude data is then calculated through the multiple attitude data, thereby improving the accuracy of the final first attitude data.

FIG. 7 is a flowchart of another exemplary method for determining camera attitude according to some embodiments of the present disclosure. In some embodiments, as shown in FIG. 7, the method further includes the following processes.

At E1, to-be-verified attitude data corresponding to the first attitude is determined according to the transformation relationship between the first attitude and the second attitude, and the second attitude data.

At E2, fourth attitude data corresponding to the first attitude is determined according to a transformation relationship between the first attitude and the third attitude, and the third attitude data.

At E3, when the accuracy of verifying the to-be-verified attitude data based on the fourth attitude data reaches a preset accuracy, it is determined that the to-be-verified attitude data is the first attitude data.

In the embodiments of the present disclosure, the to-be-verified attitude data corresponding to the first attitude is determined based on the transformation relationship between the camera in the first attitude and the camera in the second attitude, and the second attitude data. Because the accuracy of the to-be-verified attitude data is yet to be determined, it is necessary to continue to change the attitude of the camera. The fourth attitude data corresponding to the first attitude is determined based on the transformation relationship between the first attitude and the third attitude, and the third attitude data. Then a difference between the first attitude data and the fourth attitude data is determined. If the first attitude data and the fourth attitude data are both accurate, then the first attitude data and the fourth attitude data should be at least basically the same or have little difference. If the difference between the first attitude data and the fourth attitude data is large, it indicates that the accuracy of at least one of the to-be-verified attitude data and the fourth attitude data does not satisfy the requirement, and the above processes should be repeated to re-determine the first attitude data of the camera.

FIG. 8 is a flowchart of an implementation of D1 in FIG. 6. In some embodiments, as shown in FIG. 8, at D1, determining the first attitude data corresponding to the first attitude of the camera based on the transformation relationship between the first attitude and the second attitude, the second attitude data, and the third attitude data includes the following process.

At F1, the first attitude data corresponding to the first attitude of the camera is determined according to the transformation relationship between the first attitude and the second attitude, the second attitude data, the transformation relationship between the first attitude and the third attitude, the third attitude data.

In the embodiments of the present disclosure, if only one attitude adjustment is performed on the camera, it is difficult to guarantee the accuracy of the calculation result. Thus, the camera may be adjusted multiple times. Then, intermediate attitude data obtained during the multiple attitude adjustments are summed with different assigned weights to improve the accuracy of the final first attitude data. For example, a camera rotation with a small angle may be assigned a large weight, and a camera rotation with a large angle may be assigned a small weight.

FIG. 9 is a flowchart of another exemplary method for determining camera attitude according to some embodiments of the present disclosure. In some embodiments, as shown in FIG. 9, the method further includes the following process.

At G1, a display instruction is sent to the control terminal. The display instruction is used to instruct the control terminal to display a direction prompt icon. The direction indicated by the direction prompt icon is consistent with the direction in which the camera is adjusted from the first attitude to the second attitude.

Figure 10:
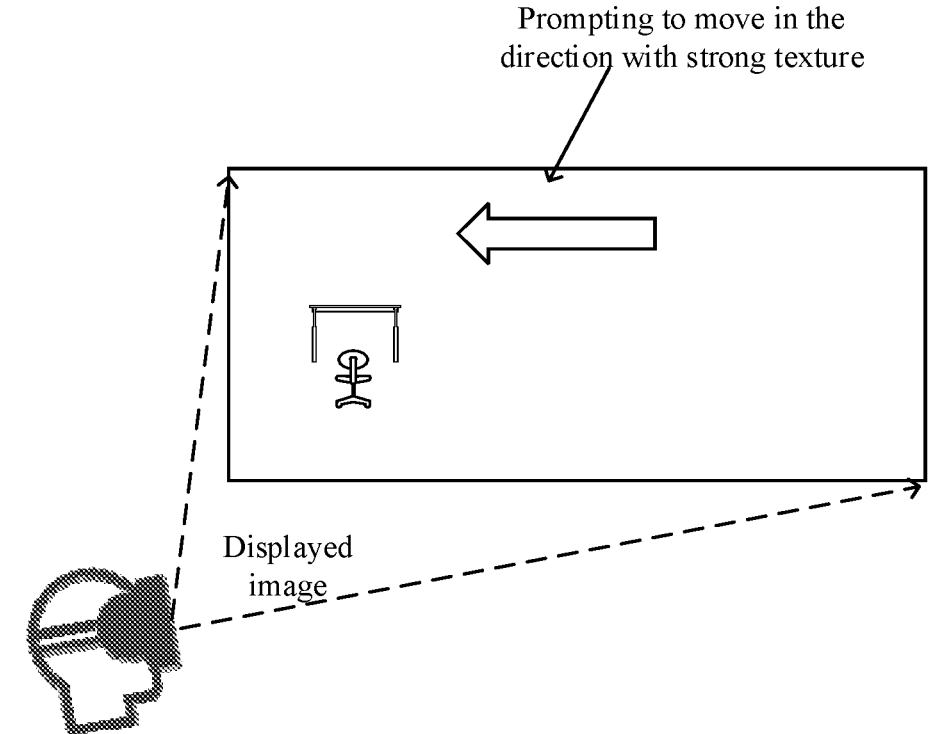
FIG. 10 is a view of prompting a user to move in a direction with strong texture according to some embodiments of the present disclosure.

FIG. 10 is a view of prompting a user to move in a direction with strong texture according to some embodiments of the present disclosure. In some embodiments, as shown in FIG. 10, the camera is installed on a pair of AR glasses. The camera attitude may be adjusted through user's neck rotation. In the embodiments of the present disclosure, after determining the portion of the first input image that satisfies the second condition, the direction and the angle of camera adjustment may be determined based on the position of the portion of the first input image with strong texture, such that the camera can be rotated in the direction with strong texture. During the adjustment process, a prompt for the camera to move in the direction with strong texture may be display on a display screen. For example, the direction of the camera movement may be prompted through graphics such as arrows. As such, when the user wears the pair of AR glasses, the camera attitude may be adjusted by rotating the user's neck.

Figure 11:
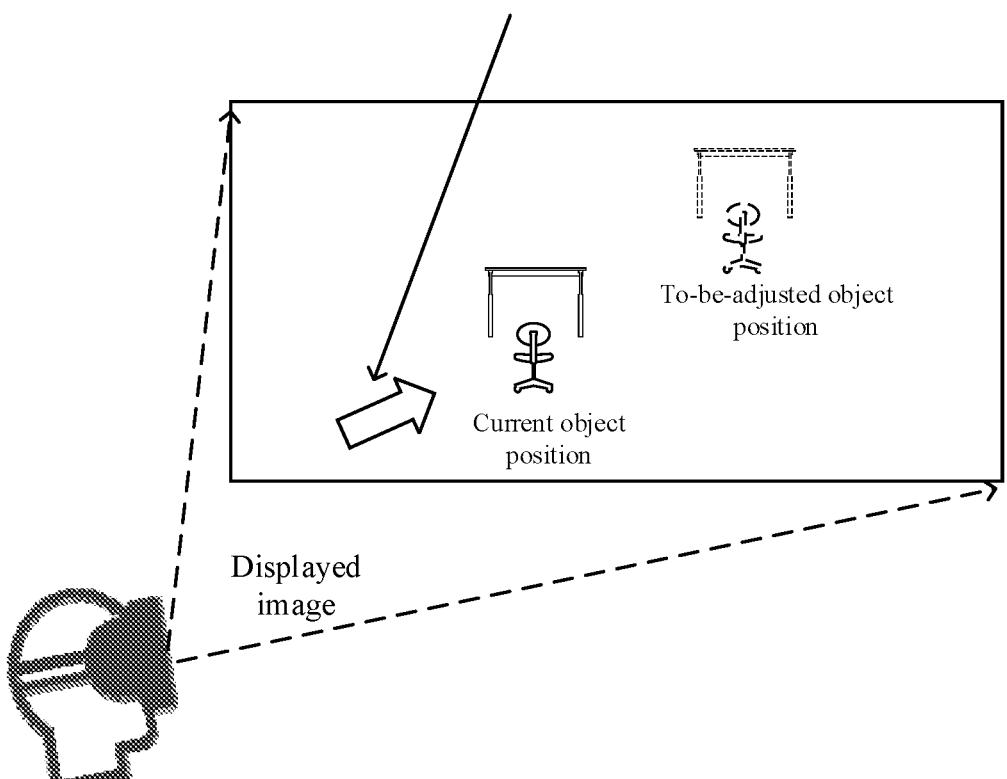
FIG. 11 is another view of prompting a user to move in a direction with strong texture according to some embodiments of the present disclosure.

FIG. 11 is another exemplary view of prompting a user to move in a direction with strong texture according to some embodiments of the present disclosure. In some embodiments, as shown in FIG. 11, the camera is installed on a pair of AR glasses. The camera attitude may be adjusted through user's neck rotation. In the embodiments of the present disclosure, after determining the portion of the first input image that satisfies the second condition, an attitude R and an angular velocity W of user's body are estimated based on an inertial sensor (IMU). Thus, the direction of the user's movement can be provided based on the IMU data. The user is prompted in the display screen a to-be-adjusted object position and a target object position. At the same time, the user is prompted with an arrow indicating the movement direction. When the to-be-adjusted object position coincides with the target object position, the adjustment is completed.

In the method of determining the camera attitude provided by the embodiments of the present disclosure, when the camera cannot accurately determine the first attitude of the camera, the camera is adjusted from the first attitude to the second attitude. The second attitude data corresponding to the second attitude is determined. The first attitude data is determined based on the transformation relationship between the first attitude and the second attitude, and the second attitude data, thereby improving the accuracy of camera repositioning.

Figure 12:
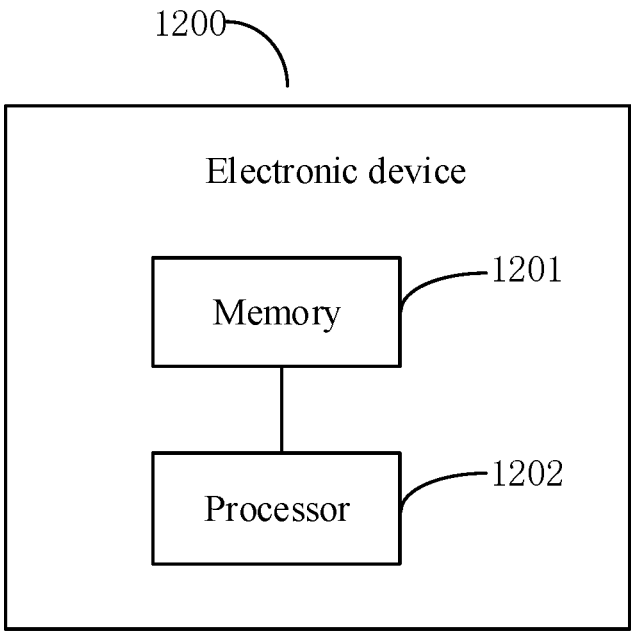
FIG. 12 is a schematic diagram of an electronic device according to some embodiments of the present disclosure.

The present disclosure also provides an electronic device. FIG. 12 is a schematic diagram of an electronic device according to some embodiments of the present disclosure.

As shown in FIG. 12, the electronic device 1200 includes: one or more memories 1201 and one or more processors 1202. The one or more memories 1201 store a computer program executed by the one or more processors 1202. When being executed by the one or more processors 1202, the computer program causes the one or more processors1202 to implement the method of determining the camera attitude described above.

The electronic device 1200 may be part or all of a computer device that implements the method of determining the camera attitude through software, hardware, or a combination of software and hardware.

As shown in FIG. 12, the electronic device 1200 includes the one or more memories 1201, the one or more processors 1202, a display (not shown), and a communication interface (not shown), etc. These components are connected through a bus system and/or other forms of connection mechanisms (not shown). It should be noted that the components and structures of the electronic device 1200 as shown in FIG. 12 are merely exemplary and not restrictive. The electronic device 1200 may also have other components and structures as needed.

The one or more memories 1201 are used to store various data generated during the operation of the electronic device and executable program instructions. For example, the one or more memories 1201 are used to store various application programs or algorithms that implement various specific functions. One or more computer program products may be included, which may include various forms of computer-readable storage media, such as volatile memory and/or non-volatile memory. The volatile memory may include, for example, random access memory (RAM) and/or cache memory, etc. The non-volatile memory may include, for example, read-only memory (ROM), hard disk, flash memory, etc.

The one or more processors 1202 may include a central processing unit (CPU), a graphics processing unit (GPU), an application specific integrated circuit (ASIC), a field programmable gate array (FPGA), or other form of processing unit with data processing capabilities and/or instruction execution capabilities, and may be other components in the electronic device 1200 to perform desired functions.

In some embodiments, the electronic device 1200 further includes an output device that can output various information (such as images or sounds) to the outside (such as a user), and may include one or more of a display device, a speaker, and the like.

The communication interface may include an interface of any currently known communication protocol, such as a wired interface or a wireless interface. The communication interface may include one or more serial ports, USB interfaces, Ethernet ports, WiFi, wired networks, DVI interfaces, device integrated interconnection modules or other suitable ports, interfaces, or connections.

In addition, in some embodiments, a storage medium is also provided, and program instructions are stored on the storage medium. When being executed by a computer or processor, the program instructions are used to perform the processes of the method of determining the camera attitude provided by the embodiment of the present disclosure. The storage medium may include, for example, a memory card of a smartphone, a storage component of a tablet computer, a hard disk of a personal computer, a read-only memory (ROM), an erasable programmable read-only memory (EPROM), a portable compact disk read-only memory (CD-ROM), a USB memory, or any combination of the above storage media.

The electronic device and the storage medium provided by the embodiments of the present disclosure can implement the aforementioned method of determining the camera attitude, and therefore have the same advantages as the aforementioned method of determining the camera attitude.

Although various embodiments have been described herein with reference to the accompanying drawings, it should be understood that the above-described embodiments are merely exemplary, and are not intended to limit the scope of the present disclosure. Various changes and modifications can be made therein by those of ordinary skill in the art without departing from the scope and spirit of the present disclosure. All such changes and modifications are intended to be included within the scope of the present disclosure as claimed in the appended claims.

Those of ordinary skill in the art will appreciate that the units and algorithm processes in various examples described in conjunction with the embodiments disclosed herein can be implemented with electronic hardware, or a combination of computer software and electronic hardware. Whether these functions are performed in hardware or software depends on the specific application and design constraints of the technical solution. Skilled artisans may implement the described functionality using different methods for each specific application, but such implementations should not be considered beyond the scope of the present disclosure.

In the embodiments of the present disclosure, it should be understood that the disclosed devices and methods may be implemented in other ways. For example, the device embodiments described above are merely illustrative. For example, the division of the units is merely a logical function division. In actual implementation, there may be other division methods. For example, multiple units or components may be combined or may be integrated into another device, or some features may be omitted, or not implemented.

In the specification, a number of specific details are described. However, it is understood that the embodiments of the present disclosure may be practiced without these specific details. In some instances, well-known methods, structures, and techniques have not been shown in detail so as not to obscure the understanding of the description.

Similarly, it should be understood that in the description of various embodiments of the present disclosure, to streamline the present disclosure and assist the understanding of one or more of various inventive aspects, various features of the present disclosure may be grouped together into a single embodiment, a single drawing, or in the description thereof. The method of disclosure, however, is not to be interpreted as reflecting an intention that the claimed invention requires more features than expressly recited in each claim. Rather, as the corresponding claims reflect, the inventive concept lies in solving a corresponding technical problem with less than all features of a single disclosed embodiment. Thus, the claims following the detailed description are hereby expressly incorporated into the specification, with each claim standing on its own as a separate embodiment of the present disclosure.

It should be understood by those skilled in the art that all features disclosed in the specification (including the accompanying claims, abstract, and drawings) and all features of any method or apparatus so disclosed may be used in any combination, except where features are mutually exclusive. Each feature disclosed in the specification (including accompanying claims, abstract, and drawings) may be replaced by an alternative feature serving the same, equivalent or similar purpose, unless expressly stated otherwise.

Furthermore, those skilled in the art should understand that although some embodiments described herein include certain features included in other embodiments but not others, combinations of features of different embodiments are meant to be within the scope of the present disclosure, and form different embodiments. For example, in the claims, any of the claimed embodiments may be used in any combination.

Various component embodiments of the present disclosure may be implemented in hardware, or in software modules running on one or more processors, or in a combination thereof. Those skilled in the art should understand that a microprocessor or a digital signal processor (DSP) may be used in practice to implement some or all functions of some modules according to the embodiments of the present disclosure. The present disclosure may also be implemented as a device program (e.g., computer program and computer program product) for performing part or all of the methods described herein. Such a program implementing the present disclosure may be stored on a computer-readable medium, or may be in the form of one or more signals. Such signals may be downloaded from an Internet website, or provided on a carrier signal, or in any other form.

It should be noted that the above-mentioned embodiments illustrate rather than limit the present disclosure, and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present disclosure may be implemented by means of hardware comprising several different elements and by means of a suitably programmed computer. In the element claim enumerating several means, several of these means may be embodied by the same item of hardware. The use of the words first, second, third, etc. does not indicate any order. These words can be interpreted as names.

The above are only specific implementation modes or descriptions of specific implementation modes of the present disclosure. The protection scope of the present disclosure is not limited thereto. Any person familiar with the technical field can easily make any changes or substitutions that come to mind, which should be covered by the protection scope of the present disclosure. The protection scope of the present disclosure shall be subject to the protection scope of the claims.

What is claimed is:

1. A method for determining camera attitude, comprising:
in response to a first input image satisfying a first condition, adjusting a camera from a first attitude to a second attitude, the first input image being an image obtained by the camera in the first attitude, and the first input image satisfying the first condition including a pedestrian area interference value appearing in a portion of the first input image;
obtaining a second input image, the second input image being an image obtained by the camera in the second attitude;
determining second attitude data corresponding to the second attitude based on the second input image; and
determining first attitude data corresponding to the first attitude according to a transformation relationship between the first attitude and the second attitude, and the second attitude data.

2. The method according to claim 1, wherein the first input image satisfying the first condition further includes:
a texture intensity of the first input image not reaching a preset value; or
failing to calculate the first attitude data through the first input image.

3. The method according to claim 1, wherein adjusting the camera from the first attitude to the second attitude comprises:

recognizing another portion of the first input image with a texture intensity satisfying a second condition;
determining a first adjustment parameter according to a position of the another portion in the first input image; and
adjusting the camera from the first attitude to the second attitude according to the first adjustment parameter.

4. The method according to claim 1, wherein adjusting the camera from the first attitude to the second attitude comprises:
rotating the camera to a preset angle, the transformation relationship being a preset transformation relationship corresponding to the preset angle.

5. The method according to claim 1, wherein adjusting the camera from the first attitude to the second attitude comprises:
receiving a control instruction sent from a control terminal, and rotating the camera according to the control instruction until receiving a confirmation instruction sent from the control terminal.

6. The method according to claim 1, wherein determining the first attitude data corresponding to the first attitude according to the transformation relationship between the first attitude and the second attitude, and the second attitude data comprises:
determining the first attitude data corresponding to the first attitude according to the transformation relationship between the first attitude and the second attitude, the second attitude data, and third attitude data, the third attitude data being attitude data determined according to a third input image obtained by the camera in a third attitude.

7. The method according to claim 6, further comprising:
determining to-be-verified attitude data corresponding to the first attitude according to the transformation relationship between the first attitude and the second attitude, and the second attitude data;
determining fourth attitude data corresponding to the first attitude according to a transformation relationship between the first attitude and the third attitude, and the third attitude data; and
in response to accuracy of verifying the to-be-verified attitude data based on the fourth attitude data reaching a preset accuracy, determining the to-be-verified attitude data to be the first attitude data.

8. The method according to claim 6, wherein determining the first attitude data corresponding to the first attitude according to the transformation relationship between the first attitude and the second attitude, the second attitude data, and the third attitude data comprises:
determining the first attitude data corresponding to the first attitude according to the transformation relationship between the first attitude and the second attitude, the second attitude data, the transformation relationship between the first attitude and the third attitude, and the third attitude data.

9. The method according to claim 1, further comprising:
sending a display instruction to a control terminal, the display instruction being used to instruct the control terminal to display a direction prompt icon, and a direction indicated by the direction prompt icon being consistent with a direction in which the camera is adjusted from the first attitude to the second attitude.

10. An electronic device, comprising a memory storing a computer program; and one or more processors coupled to the memory, wherein when being executed by the one or more processors, the computer program causes the processors to:

in response to a first input image satisfying a first condition, adjust a camera from a first attitude to a second attitude, the first input image being an image obtained by the camera in the first attitude, and the first input image satisfying the first condition including a pedestrian area interference value appearing in a portion of the first input image;

obtain a second input image, the second input image being an image obtained by the camera in the second attitude;

determine second attitude data corresponding to the second attitude based on the second input image; and determine first attitude data corresponding to the first attitude according to a transformation relationship between the first attitude and the second attitude, and the second attitude data.

11. The electronic device according to claim 10, wherein the first input image satisfying the first condition further includes:

a texture intensity of the first input image not reaching a preset value; or failing to calculate the first attitude data through the first input image.

12. The electronic device according to claim 10, wherein when adjusting the camera from the first attitude to the second attitude, the processor is further configured to:

recognize another portion of the first input image with a texture intensity satisfying a second condition;

determine a first adjustment parameter according to a position of the portion in the first input image; and adjust the camera from the first attitude to the second attitude according to the first adjustment parameter.

13. The electronic device according to claim 10, wherein when adjusting the camera from the first attitude to the second attitude, the processor is further configured to:

rotate the camera to a preset angle, the transformation relationship being a preset transformation relationship corresponding to the preset angle.

14. The electronic device according to claim 10, wherein when adjusting the camera from the first attitude to the second attitude, the processor is further configured to:

receive a control instruction sent from a control terminal, and rotate the camera according to the control instruction until receiving a confirmation instruction sent from the control terminal.

15. The electronic device according to claim 10, wherein when determining the first attitude data corresponding to the first attitude according to the transformation relationship between the first attitude and the second attitude, and the second attitude data, the processor is further configured to:

determine the first attitude data corresponding to the first attitude according to the transformation relationship between the first attitude and the second attitude, the second attitude data, and third attitude data, the third attitude data being attitude data determined according to a third input image obtained by the camera in a third attitude.

16. The electronic device according to claim 15, wherein the processor is further configured to:

determine to-be-verified attitude data corresponding to the first attitude according to the transformation relationship between the first attitude and the second attitude, and the second attitude data;

determine fourth attitude data corresponding to the first attitude according to a transformation relationship between the first attitude and the third attitude, and the third attitude data; and in response to accuracy of verifying the to-be-verified attitude data based on the fourth attitude data reaching a preset accuracy, determine the to-be-verified attitude data to be the first attitude data.

17. The electronic device according to claim 15, wherein when determining the first attitude data corresponding to the first attitude according to the transformation relationship between the first attitude and the second attitude, the second attitude data, and the third attitude data, the processor is further configured to:

determine the first attitude data corresponding to the first attitude according to the transformation relationship between the first attitude and the second attitude, the second attitude data, the transformation relationship between the first attitude and the third attitude, and the third attitude data.

18. The electronic device according to claim 10, wherein the processor is further configured to:

send a display instruction to a control terminal, the display instruction being used to instruct the control terminal to display a direction prompt icon, and a direction indicated by the direction prompt icon being consistent with a direction in which the camera is adjusted from the first attitude to the second attitude.

19. The method according to claim 3, wherein the second condition includes that the another portion of the first input image does not have the pedestrian area interference value.

20. A method for determining camera attitude, comprising:

in response to a first input image satisfying a first condition, adjusting a camera from a first attitude to a second attitude, the first input image being an image obtained by the camera in the first attitude;

obtaining a second input image, the second input image being an image obtained by the camera in the second attitude;

determining second attitude data corresponding to the second attitude based on the second input image; and determining first attitude data corresponding to the first attitude according to a transformation relationship between the first attitude and the second attitude, and the second attitude data, including:

determining to-be-verified attitude data corresponding to the first attitude according to the transformation relationship between the first attitude and the second attitude, and the second attitude data;

determining fourth attitude data corresponding to the first attitude according to a transformation relationship between the first attitude and a third attitude, and third attitude data, the third attitude data being attitude data determined according to a third input image obtained by the camera in the third attitude; and in response to accuracy of verifying the to-be-verified attitude data based on the fourth attitude data reaching a preset accuracy, determining the to-be-verified attitude data to be the first attitude data.

* * * * *